(12) United States Patent
Hashiguchi

(10) Patent No.: US 10,139,042 B2
(45) Date of Patent: Nov. 27, 2018

(54) CRANE APPARATUS FOR SHOOTING

(71) Applicant: Nihon Video System Co., Ltd., Tsushima-shi, Aichi (JP)

(72) Inventor: Kentaro Hashiguchi, Tsushima (JP)

(73) Assignee: Nihon Video System Co., Ltd., Tsushima-shi (JP)

(*) Notice: Subject to any disclaimer, the term of this patent is extended or adjusted under 35 U.S.C. 154(b) by 0 days.

(21) Appl. No.: 15/654,560

(22) Filed: Jul. 19, 2017

(65) Prior Publication Data

US 2018/0023754 A1   Jan. 25, 2018

(30) Foreign Application Priority Data

Jul. 20, 2016 (JP) .................. 2016-142573
Apr. 24, 2017 (JP) .................. 2017-085715

(51) Int. Cl.
| | | |
|---|---|---|
| *G03B 17/56* | (2006.01) | |
| *F16M 11/24* | (2006.01) | |
| *F16M 11/10* | (2006.01) | |
| *F16M 11/20* | (2006.01) | |
| *F16M 11/04* | (2006.01) | |
| *F16M 11/12* | (2006.01) | |

(52) U.S. Cl.
CPC ........... *F16M 11/24* (2013.01); *F16M 11/10* (2013.01); *F16M 11/2021* (2013.01); *G03B 17/561* (2013.01); *F16M 11/04* (2013.01); *F16M 11/12* (2013.01); *F16M 2200/044* (2013.01); *F16M 2200/068* (2013.01); *F16M 2200/08* (2013.01)

(58) Field of Classification Search
CPC .................................................. G03B 17/56
USPC ......................................................... 396/428
See application file for complete search history.

(56) References Cited

U.S. PATENT DOCUMENTS

| | | | | |
|---|---|---|---|---|
| 1,942,925 A | * | 1/1934 | Jenkins | H04R 1/08 |
| | | | | 248/123.2 |
| 4,360,111 A | * | 11/1982 | Weiskopf | B66C 23/42 |
| | | | | 212/196 |
| D289,835 S | * | 5/1987 | Schoenig | D14/229 |
| 4,671,478 A | * | 6/1987 | Schoenig | F16B 7/0413 |
| | | | | 16/19 |

(Continued)

FOREIGN PATENT DOCUMENTS

| | | | |
|---|---|---|---|
| JP | 8-68493 A | 3/1996 | |
| JP | H0868493 | * 3/1996 | ............. F16M 11/04 |

(Continued)

OTHER PUBLICATIONS

Tiefenbrunn, Walter, 'Camera Crane', WO2005054112, Jun. 16, 2005, 49 pages.*

(Continued)

*Primary Examiner* — Clayton E Laballe
*Assistant Examiner* — Kevin Butler
(74) *Attorney, Agent, or Firm* — Christensen O'Connor Johnson Kindness PLLC

(57) ABSTRACT

A crane apparatus for shooting is provided that achieves good operability and does not catch the hand. According to the crane apparatus for shooting of the present invention, the sub jibs are configured to be built in the main jib or a gap between the main jib and the sub jib is configured not to expose to the outside, and the hand of a cameraman is not caught between the main jib and the sub jib.

9 Claims, 9 Drawing Sheets

(56) References Cited

U.S. PATENT DOCUMENTS

| | | | | |
|---|---|---|---|---|
| 4,849,778 | A * | 7/1989 | Samuelson | F16M 11/10 248/281.11 |
| 5,644,377 | A * | 7/1997 | Romanoff | B66F 11/048 352/243 |
| 5,940,645 | A * | 8/1999 | Bonin | B66F 11/048 352/243 |
| 6,450,706 | B1 * | 9/2002 | Chapman | B66F 11/048 212/195 |
| 6,752,541 | B1 * | 6/2004 | Dykyj | B66F 11/048 248/123.11 |
| 6,820,980 | B1 * | 11/2004 | Romanoff | B66F 11/048 248/187.1 |
| D588,621 | S * | 3/2009 | Baty | D16/242 |
| D713,442 | S * | 9/2014 | Baty | D16/242 |
| 8,894,302 | B2 * | 11/2014 | Tardieu | F16M 11/043 248/187.1 |
| D722,637 | S * | 2/2015 | Baty | D16/242 |
| D725,694 | S * | 3/2015 | Florey | F16M 13/022 D16/242 |
| 2002/0001471 | A1 * | 1/2002 | Chapman | B66F 11/048 396/428 |
| 2002/0168188 | A1 * | 11/2002 | Fix | B66F 11/048 396/419 |
| 2003/0076480 | A1 * | 4/2003 | Burbulla | B66F 11/048 352/243 |
| 2005/0007553 | A1 * | 1/2005 | Romanoff | B66F 11/048 352/243 |
| 2005/0053274 | A1 * | 3/2005 | Mayer | G03B 21/18 382/154 |
| 2005/0191049 | A1 * | 9/2005 | Chapman | B66F 11/048 396/428 |
| 2006/0088309 | A1 * | 4/2006 | Hein | B66F 11/048 396/428 |
| 2006/0147196 | A1 * | 7/2006 | Hein | B66C 23/18 396/428 |
| 2006/0228105 | A1 * | 10/2006 | Chapman | B66F 11/048 396/419 |
| 2009/0097840 | A1 * | 4/2009 | Amadril | B66F 11/048 396/428 |
| 2009/0107945 | A1 * | 4/2009 | Ehrenleitner | E04G 21/0418 212/176 |
| 2010/0193457 | A1 * | 8/2010 | Rotheisler | B66C 23/14 212/195 |
| 2013/0034347 | A1 * | 2/2013 | Randy | F16M 11/2085 396/428 |
| 2013/0183028 | A1 * | 7/2013 | Chapman | G03B 17/561 396/428 |
| 2013/0209085 | A1 * | 8/2013 | Wood | F16M 11/2064 396/428 |
| 2014/0014807 | A1 * | 1/2014 | Kamm | F16M 11/04 248/558 |
| 2014/0097307 | A1 * | 4/2014 | McKay | F16M 11/2021 248/122.1 |
| 2014/0291457 | A1 * | 10/2014 | Rotheisler | F16M 11/2085 248/123.2 |
| 2016/0195798 | A1 * | 7/2016 | Nenov | F16M 13/04 348/373 |
| 2016/0269648 | A1 * | 9/2016 | Hayashi | H04N 5/23203 |
| 2018/0023754 | A1 * | 1/2018 | Hashiguchi | F16M 11/24 |

FOREIGN PATENT DOCUMENTS

| | | |
|---|---|---|
| JP | 9-46558 A | 2/1997 |
| JP | 2007-300326 A | 11/2007 |
| JP | 2009-280341 A | 12/2009 |
| JP | 2014-228824 A | 12/2014 |
| WO | 2015/098418 A1 | 7/2015 |

OTHER PUBLICATIONS

Explanation for Accelerated Examination, submitted Jul. 20, 2016, for Japanese Patent Application No. 2016-142573, filed Jul. 20, 2016, 4 pages.

"EZ-FX JIB/EZ-FX Junior JIB," Cinemax, n.d., <http://www.cinemax.jp/product/i1256029325-110969/c5/m/> [retrieved Jul. 14, 2017], 4 pages.

"Jib Arm," Acebil Japan © 2017, <http://www.acebil.co.jp/products/Jib/jib.html> [retrieved Jul. 14, 2017], 4 pages.

"Lens Controls," VariZoom © 2014, <http://www.varizoom.com/focus-zoom-camera-lens-controls-s/1814.htm> [retrieved Jul. 14, 2017], 2 pages.

Office Action dated Oct. 27, 2016, issued in Japanese Application No. 2016-142573, filed Jul. 20, 2016, 7 pages.

"TK-65," Shotoku © 2014, <http://www.shotoku.tv/jp/product/product_show?id=55&pro_id=161> [retrieved Jul. 14, 2017], 2 pages.

* cited by examiner

CRANE APPARATUS FOR SHOOTING

TECHNICAL FIELD

The present invention relates to a crane apparatus for shooting suitably used for an up-and-down and horizontal moving shot within a certain region and the like particularly in shooting under the leadership of a cameraman in a small room or a small scale.

BACKGROUND ART

Conventional crane apparatuses for shooting are designed to place a camera at the tip of a jib for panning and up-and-down movement and thus have a jib and a sub jib to keep the camera horizontal by moving in parallel with the ground while such a crane for shooting is moved vertically. In addition, to the rear of the jib, an extensive balance weight is attached. A cameraman may operate by standing immediately beside the camera attached to the crane for shooting or operate from the rear weight side of the jib.

Currently commercially available cranes for shooting are capable of keeping a camera platform horizontal by a jib and a sub jib.

SUMMARY OF THE INVENTION

Technical Problem

Even a small-scale crane apparatus for shooting requires several persons under the leadership of a cameraman to move and set the equipment. The balance weight is particularly heavy, and even for mounting a small camera, a weight is attached to the opposite side of the camera, and the weight from 20 to 30 kg itself is mounted. Small crane apparatuses for shooting have two jibs, a jib and a sub jib, to keep the camera horizontal. Since the jibs are moved vertically, the interval between the two jibs is widest when they are parallel with the ground and becomes narrow when the jibs are moved up and down, resulting in a risk of catching the hand. The mounted camera is currently operated by the camera body directly or by attachment of a remote controller connected to the camera. The shooting style in recent years includes cameras different from cameras with a system designed as a studio camera for broadcasting, for example, a single-lens reflex camera taking a video, a digital movie camera, and the like. Most of such cameras are not capable of tally display.

However, for example, when a staff for shooting intends to move the equipment, the equipment is separately disassembled into the tripod, the jibs, the weight, the camera platform, and the camera.

A user standing next to the camera in the crane apparatus for shooting looks through a viewfinder and moves the crane by placing the hand on the jib. Since there are two jibs, up-and-down movement may cause catching the hand.

Further, to operate the crane apparatus for shooting on the weight side of the apparatus, a separate remote controller for the camera is required, causing the equipment to be extensive.

In shooting by a plurality of cameras using a switcher and a crane apparatus for shooting, some cameras do not have a tally lamp to tell the cameramen and the cast which camera is selected.

The present invention has been made in view of such circumstances. It is an object thereof to provide a crane apparatus for shooting that is, for example, capable of setting by a few people under the leadership of a cameraman, has no concern for catching the hand even when the person operates by panning and tilting while the person him/herself looks through the viewfinder of the camera and touching any portion of the jibs of the apparatus, and has no need for a separate remote controller because the jib body has a camera operation function.

Solution to Problem

According to the present invention, a crane apparatus for shooting is provided that includes: a jib to keep a camera horizontal; and a jib fulcrum mount supporting the jib, wherein the jib includes a main jib and a sub jib, the apparatus is configured to have the sub jib built in the main jib or not to expose a gap between the main jib and the sub jib to outside, the apparatus includes first and second shafts, first and second sub jib mounting arms, and first and second sub jib mounting movable portions, the first sub jib mounting arm is provided between the first shaft and the first sub jib mounting movable portion, the second sub jib mounting arm is provided between the second shaft and the second sub jib mounting movable portion, a distance between the first shaft and the first sub jib mounting movable portion is same as a distance between the second shaft and the second sub jib mounting movable portion, the main jib is relatively rotatably coupled to the first sub jib mounting arm at the first shaft, the main jib is relatively rotatably coupled to the second sub jib mounting arm at the second shaft, the sub jib is relatively rotatably coupled to the first sub jib mounting arm at the first sub jib mounting movable portion, the sub jib is relatively rotatably coupled to the second sub jib mounting arm at the second sub jib mounting movable portion, the jib fulcrum mount is mounted to the main jib via the first shaft not to move the first sub jib mounting arm when an angle of the sub jib to the first and second sub jib mounting arms is changed; the camera is mounted to the main jib via the second shaft not to allow movement relative to the second sub jib mounting arm; the first and second sub jib mounting arms are configured to be maintained in parallel when the angle of the sub jib to the first and second sub jib mounting arms is changed; and the camera is configured to be movable in an up-and-down direction while maintained horizontal by changing the angle of the sub jib to the first and second sub jib mounting arms.

In the present invention, a jib (boom) to keep a camera horizontal is configured to have a sub jib mechanism built in a main jib or not to expose a gap between the main jib and the sub jib to the outside. The mechanism to maintain the camera horizontal provides one jib in an outward appearance.

Preferably, a straight line connecting the first and second shafts is configured to be in parallel with the sub jib.

Preferably, the jib includes two or more shafts to mount the jib to the jib fulcrum mount. In this case, there are two or more fulcrum portions to support the jib. This provides a change in the jib balancing position by moving the jib fulcrum upon assembly according to the camera weight.

Preferably, a video camera battery is allowed to be attached on the rear weight side of the jib in the crane apparatus for shooting. This enables attachment of the battery, usually remaining attached to the camera, on the weight side of the jib to reduce the original balance weight.

Preferably, the apparatus includes a power supply cable for the camera and the jib and the jib body includes a switch to control power supply for the camera according to a power on/off signal from a cameraman.

Preferably, a remote controller terminal for the camera attached to the crane apparatus for shooting is connected by providing a connector in the jib body, and the jib includes any one or more of a zoom remote controller, an iris remote controller, a focus remote controller, and a recording button.

The present inventor thus found that shooting using a jib is often performed in a small room and shooting using a crane does not require large up-and-down movement. The inventor found that, for example, a jib is often used in an area having a radius of as small as 2 to 3 m.

Use of this crane allows settings for shooting by one person and shifting of the fulcrum position. The inventor found an advantage that the fulcrum placed at a distance from the camera increases a jib swing and a shooting range in an up-and-down direction and a fulcrum set close to the camera reduces the swing width while a less weight is required, and thus has come to complete the present invention.

Advantageous Effects of the Invention

As clearly described above, according to the present invention, a sub jib is configured to be built inside the body of the main jib or a gap between the main jib and the sub jib is configured not to expose to the outside. There is thus no concern that a cameraman concentrated on the viewfinder gets the hand caught between the main jib and the sub jib. The concern is eliminated that the exposed sub jib used to be dangerous during operation of the sub jib by looking through the viewfinder of the camera. A battery used to be mounted directly to the camera is attached to the opposite side of the fulcrum of the jib, allowing reduction in the weight attached to the jib. A recording button, a focus control, a zoom control, and an iris control built in the jib body allows no preparation of a separate remote controller for operation near the weight by a cameraman, which is quite convenient. A tally input by the jib lights the tally near the camera platform and near the weight, leading to good visual recognition and convenience. This is very effective for a camera with no tally lighting function. The monitor is moved in parallel similar to the camera even when the height of the jib is changed, and ease of watching the monitor is a feature when the cameraman operates the jib on the weight side. The monitor stand attached to the remote controller for the camera greatly facilitates operation of raising and lowering the jib compared with use of a weight rod.

DESCRIPTION OF EMBODIMENTS

Embodiments of the present invention is described below with reference to the drawings.

1. First Embodiment

Figure 1:
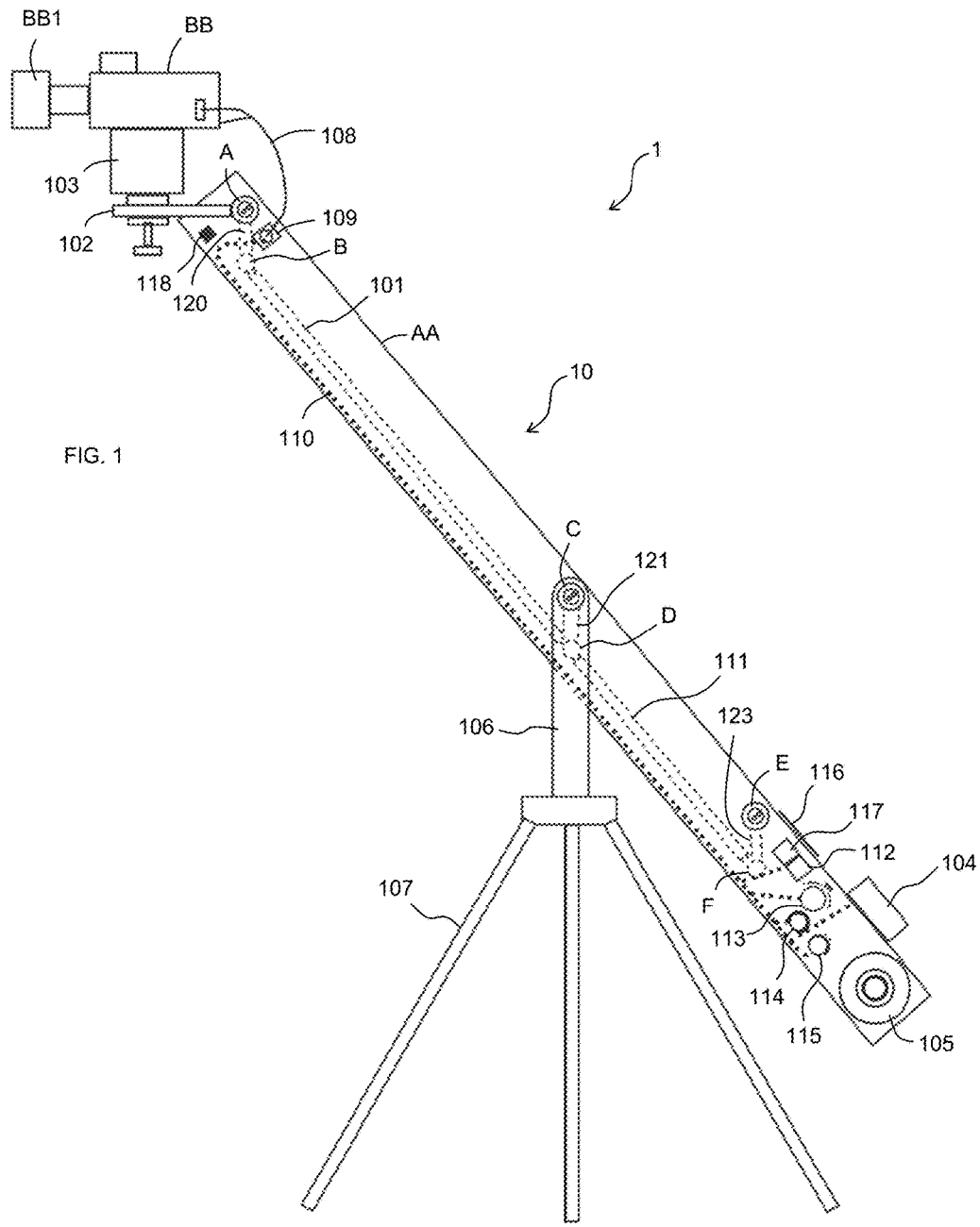
FIG. 1 illustrates the entire crane apparatus in a first embodiment according to the present invention. The drawing illustrates a case of a fulcrum of a jib at the center. The broken line area is a trace view of a mechanism.

FIG. 1 illustrates a state of a video camera BB attached to a crane apparatus 1 for shooting in the first embodiment of the present invention. The crane apparatus 1 includes a jib 10. The jib 10 has a function allowing parallel movement of the video camera BB while the video camera BB is maintained horizontal. The jib 10 includes a main jib AA and sub jibs 101 and 111.

Figure 2:
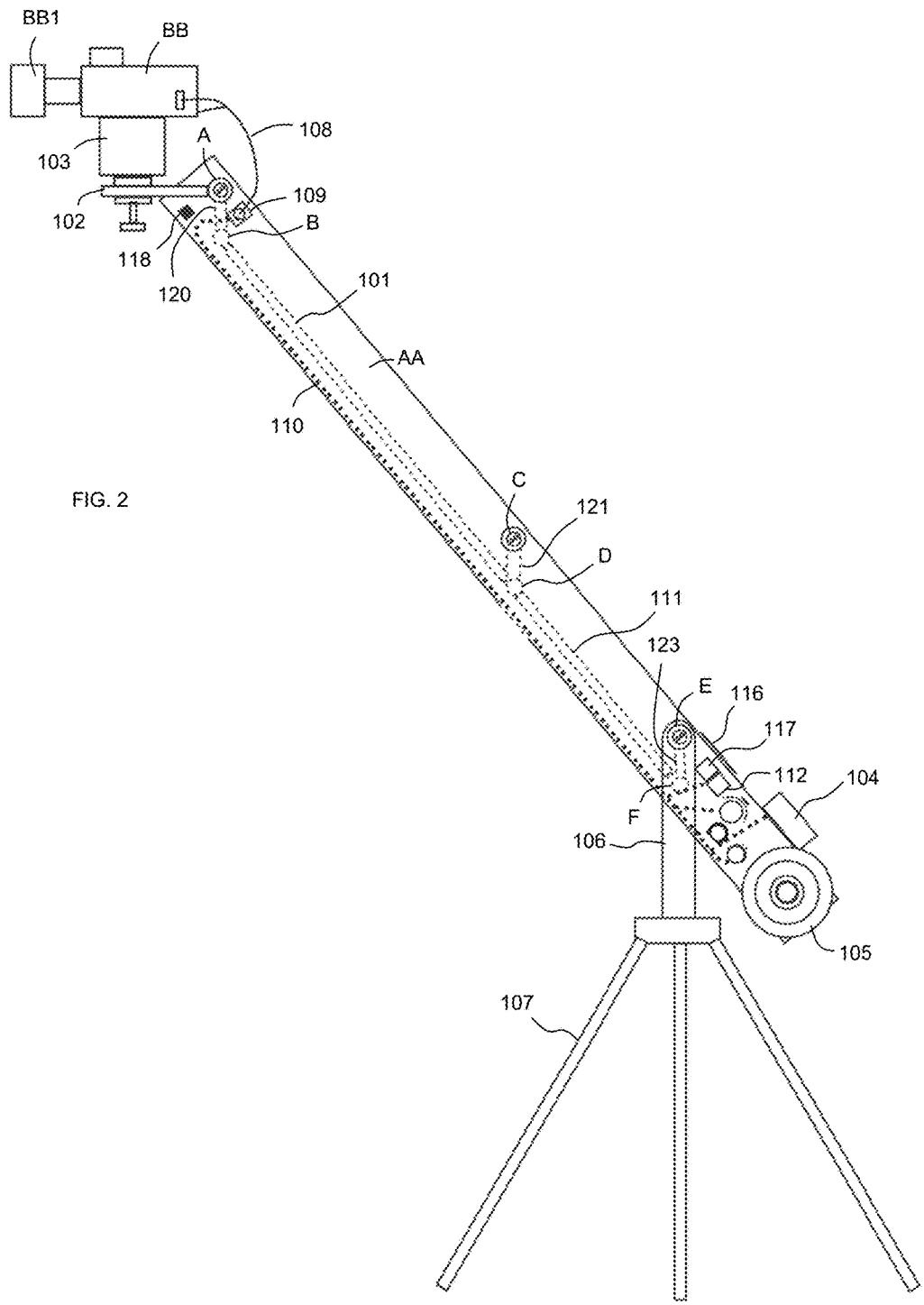
FIG. 2 illustrates a state of attaching a jib fulcrum mount 106 of the crane apparatus in FIG. 1 to a shaft E.

The main jib AA is attached to a jib fulcrum mount 106 at a shaft C. As illustrated in FIG. 2, the main jib AA may be attached to the jib fulcrum mount 106 at a shaft E. The jib fulcrum mount 106 is provided to a tripod 107. To a shaft A, a camera platform mount 102 is attached.

The shafts A, C, and E are constantly fixed to sub jib mounting arms 120, 121, and 123, respectively. The main jib AA is relatively rotatable to the sub jib mounting arms 120, 121, and 123 at the shafts A, C, and E. Sub jib mounting movable portions B, D, and F relatively rotatably couple the sub jib mounting arms 120, 121, and 123 to the sub jibs 101 and 111. When the camera BB is moved vertically, the sub jib mounting arm 121 fixed to the shaft C attached to the jib fulcrum mount 106 does not move, and the sub jib mounting arms 120 and 123 move in parallel with the sub jib mounting arm 121. The sub jibs 101 and 111 move in parallel with the main jib AA.

To the camera platform mount 102, a video camera platform 103 is mounted and the video camera BB is mounted. The video camera BB includes a lens BB1. A jib-camera connecting cable 108 connected to the camera BB is connected to a jib-camera connecting connector 109. Through a power/signal line 110, power is supplied from a battery 104 to the camera BB. By a recording button 112, a zoom volume control 113, a focus volume control 114, and an iris volume control 115, recording, a focal position, a zoom position, and an aperture position of the camera BB is controlled through the power/signal line 110.

Tally lighting units 117 and 118 are provided respectively at the rear and the front of the main jib AA. The tally lighting units 117 and 118 are lit based on a tally signal input from a tally signal/camera CCU input connector 116.

FIG. 2 illustrates a state of the main jib AA attached to the jib fulcrum mount 106 at the shaft E. In this case, a weight 105 attached to the rear of the main jib AA becomes heavy while a swing area increases, leading to an advantage of a large height difference.

Figure 3:
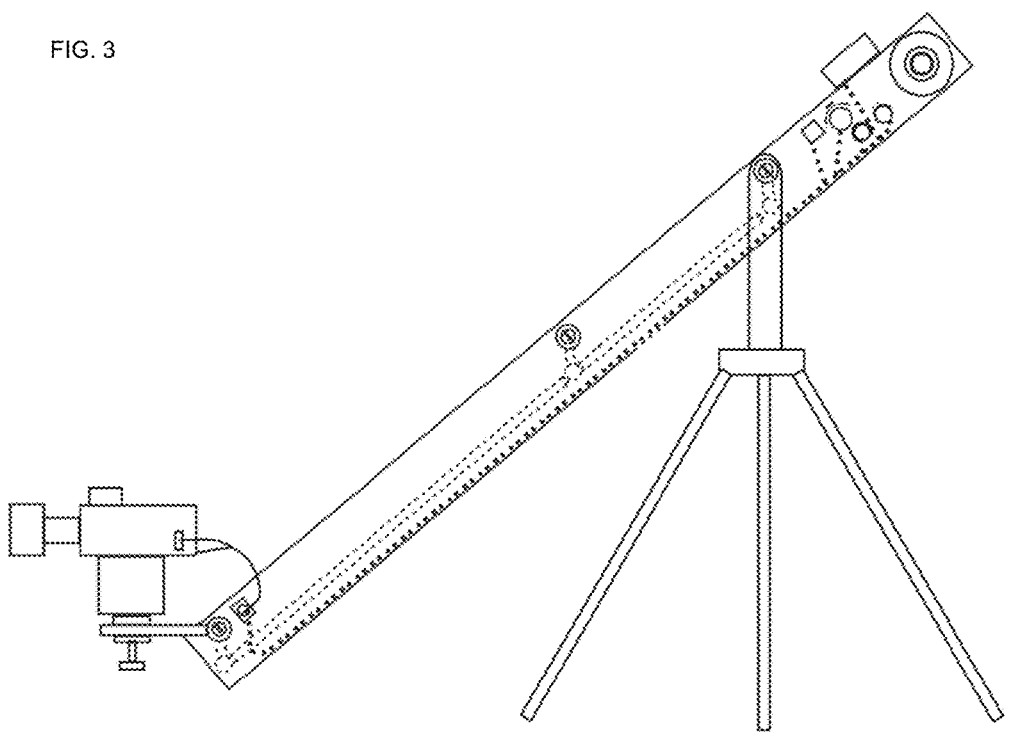
FIG. 3 illustrates a state of lowering the position of a camera BB from the state in FIG. 2.

FIG. 3 illustrates a state of the front of the main jib AA lowered downward. When the main jib AA in FIG. 1 is directly lowered, the sub jibs 101 and 111 fixed to the sub jib mounting arms 120, 121, and 123 move in parallel with the main jib AA. At this point, the camera platform mount 102 is changed in height remaining in parallel with the ground.

Figure 4:
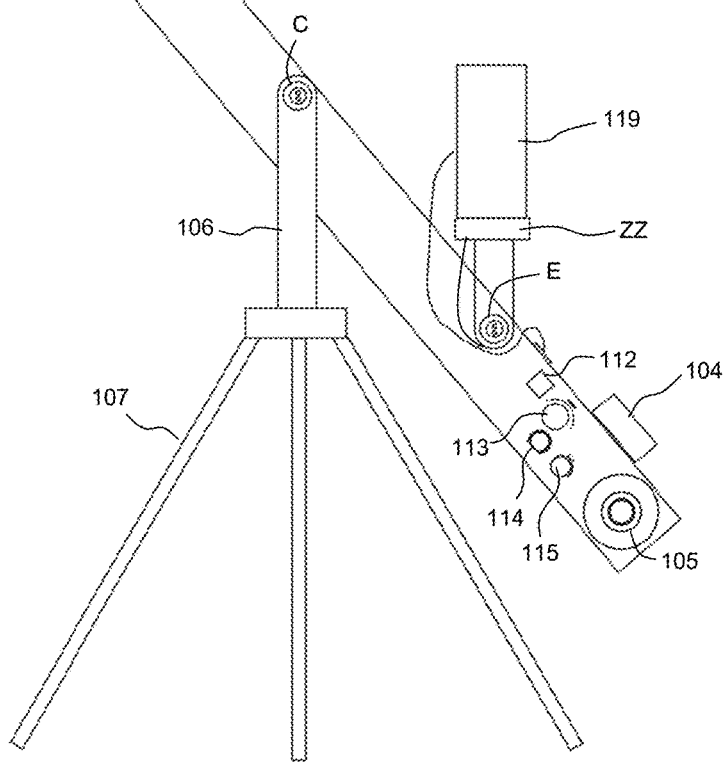
FIG. 4 illustrates a state of attaching a monitor mount to the shaft E in the crane apparatus in FIG. 1.

In FIG. 4, the shaft E is attached to a monitor mount ZZ and a monitor 119 is attached to the monitor mount ZZ. The monitor mount ZZ is capable of moving in parallel similar to the camera BB.

Figure 5:
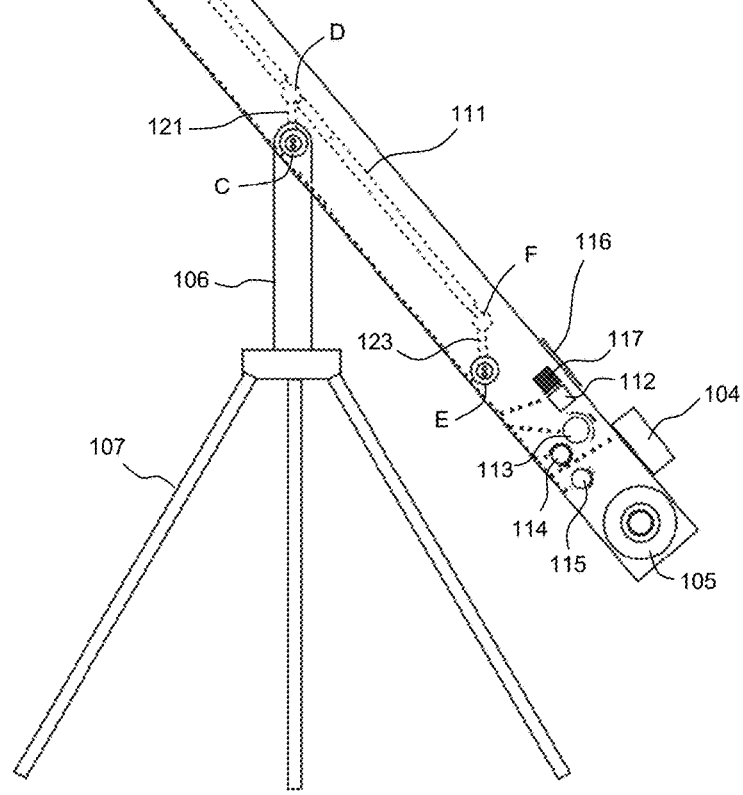
FIG. 5 is a modification of the crane apparatus in FIG. 1 and illustrates a case of a sub jib 101 above a shaft C.

FIG. 5 illustrates a case of the sub jibs 101 and 111 arranged above the shafts A, C, and E. Although the mechanism is upside down from that in FIG. 1, the effects same as those in FIG. 1 are obtained.

Figure 6:
FIG. 6 is a reference picture of a commercially available jib arm. That is, a reference picture illustrates a currently commercially available crane for shooting in a general form.

A cover for example may be attached to cover the gap between the main jib AA and the sub jib 101 in a conventional configuration as illustrated in FIG. 6, not to expose the gap between the main jib AA and the sub jib 101 to the outside.

Figure 7:
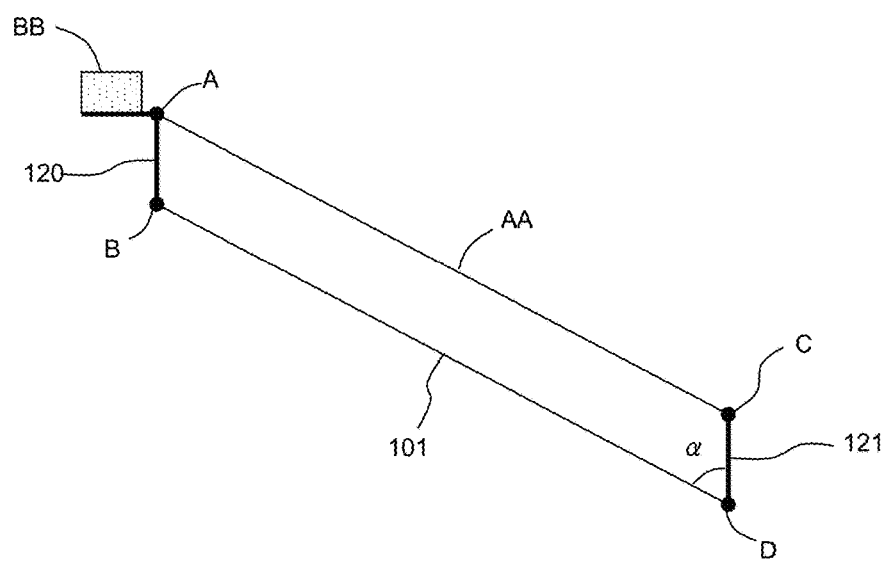
FIG. 7 is a diagram illustrating the principle of operation of the crane apparatus for shooting of the present invention.
Figure 8:
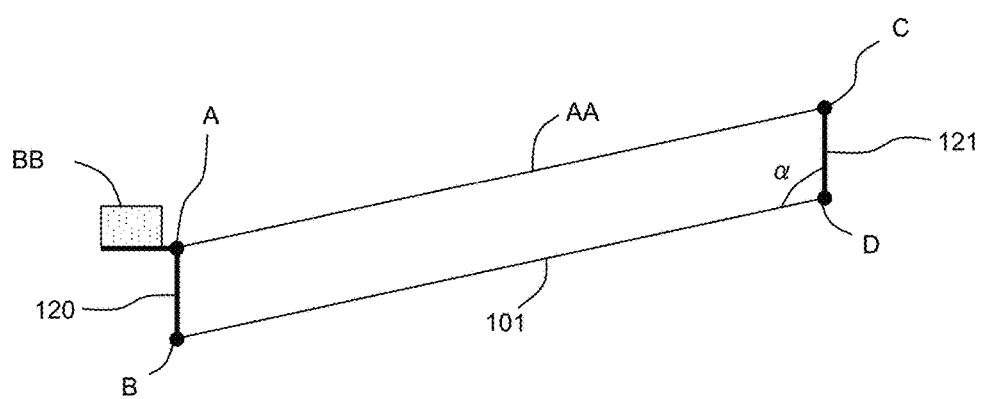
FIG. 8 is a diagram illustrating the principle of operation of the crane apparatus for shooting of the present invention.

Here, with reference to FIGS. 7 to 8, the principle of operation of the crane apparatus in the present embodiment is described again. To facilitate the understanding of the principle, the main jib AA is drawn by one line but note that, as illustrated in FIG. 1 etc., even the case of building the sub jib 101 in the main jib AA has the same principle of operation.

In the crane apparatus in the present embodiment, the sub jib mounting arms 120 and 121 are relatively rotatable to the main jib AA and the sub jib 101 at the shafts A and C and the sub jib mounting movable portions B and D. A distance between the shaft C and the sub jib mounting movable portion D is same as a distance between the sub jib mounting movable portion B. The shafts A and C and the sub jib mounting movable portions B and D constantly form a parallelogram.

Since the jib fulcrum mount 106 is mounted not to move the sub jib mounting arm 121, a change in an angle α in FIGS. 7 and 8 moves up and down remaining the sub jib mounting arm 120 maintained in parallel with the sub jib mounting arm 121.

Since the camera BB is fixed to the sub jib mounting arm 120 not to allow movement, the camera BB moves up and down while maintained horizontal associated with up-and-down movement of the sub jib mounting arm 120.

2. Second Embodiment

Figure 9:
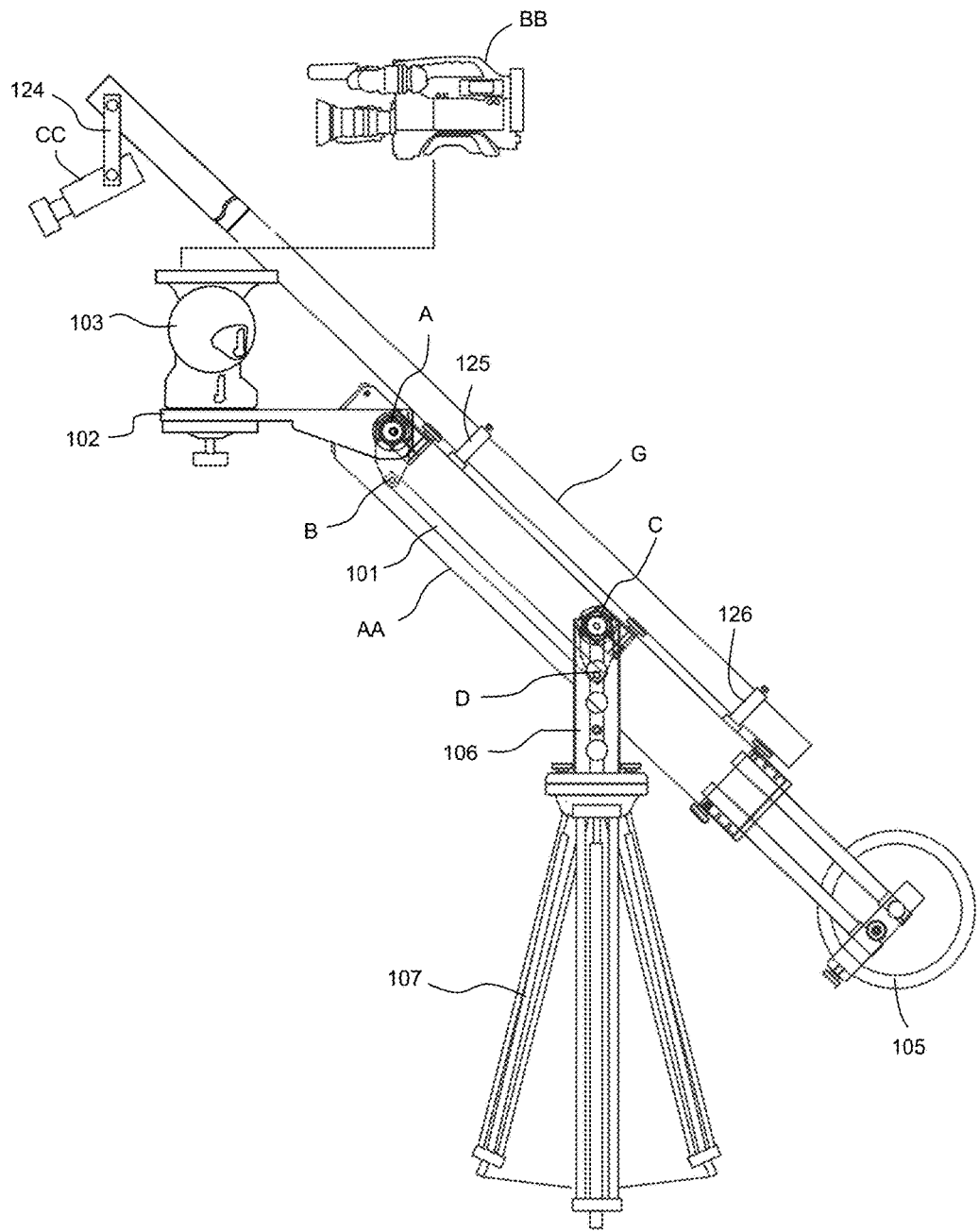
FIG. 9 is a configuration diagram of a crane apparatus in a second embodiment of the present invention.

FIG. 9 illustrates a state of the crane apparatus 1 in the second embodiment of the present invention attached to the video camera BB. The behavior of the crane apparatus 1 in the present embodiment is in common with that in the first embodiment. In the present embodiment, long arm jib fittings 125 and 126 are attached to the main jib AA, and a long arm jib G longer than the main jib AA is attached to the long arm jib fittings 125 and 126. The long arm jib G may be configured in a single-stage configuration or an extendable multi-stage jib. At the tip of the long arm jib G, a video camera fitting 124 is provided, and the video camera fitting 124 is attached to a video camera CC. The present embodiment enables simultaneous shooting by the two video cameras BB and CC.

REFERENCE SIGNS LIST

1: Crane Apparatus for Shooting
10: Jib
101: Sub Jib
102: Camera Platform Mount
103: Video Camera Platform
104: Battery
105: Weight
106: Jib Fulcrum Mount
107: Tripod
108: Jib-Camera Connecting Cable
109: Jib-Camera Connecting Connector
110: Signal Line
111: Sub Jib
112: Recording Button
113: Zoom Volume Control
114: Focus Volume Control
115: Iris Volume Control
116: Camera CCU Input Connector
117: Tally Lighting Unit
118: Tally Lighting Unit
119: Monitor
120: Sub Jib Mounting Arm
121: Sub Jib Mounting Arm
123: Sub Jib Mounting Arm
124: Video Camera Fitting
125: Long Arm Jib Fitting
126: Long Arm Jib Fitting
AA: Main Jib
BB: Video Camera
CC: Video Camera
BB1: Lens
A: Shaft
B: Sub Jib Mounting Movable Portion
C: Shaft
D: Sub Jib Mounting Movable Portion
E: Shaft
F: Sub Jib Mounting Movable Portion
G: Long Arm Jib
ZZ: Monitor Mount
α: Angle

The invention claimed is:

1. A crane apparatus for shooting, comprising: a jib to keep a camera horizontal; and a jib fulcrum mount supporting the jib, wherein
  the jib includes a main jib and a sub jib,
  the apparatus is configured to have the sub jib built in the main jib or not to expose a gap between the main jib and the sub jib to outside,
  the apparatus includes first and second shafts, first and second sub jib mounting arms, and first and second sub jib mounting movable portions,
  the first sub jib mounting arm is provided between the first shaft and the first sub jib mounting movable portion,
  the second sub jib mounting arm is provided between the second shaft and the second sub jib mounting movable portion,
  a distance between the first shaft and the first sub jib mounting movable portion is same as a distance between the second shaft and the second sub jib mounting movable portion,
  the main jib is relatively rotatably coupled to the first sub jib mounting arm at the first shaft,
  the main jib is relatively rotatably coupled to the second sub jib mounting arm at the second shaft,
  the sub jib is relatively rotatably coupled to the first sub jib mounting arm at the first sub jib mounting movable portion,
  the sub jib is relatively rotatably coupled to the second sub jib mounting arm at the second sub jib mounting movable portion,
  the jib fulcrum mount is mounted to the main jib via the first shaft not to move the first sub jib mounting arm when an angle of the sub jib to the first and second sub jib mounting arms is changed;
  the camera is mounted to the main jib via the second shaft not to allow movement relative to the second sub jib mounting arm;

the first and second sub jib mounting arms are configured to be maintained in parallel when the angle of the sub jib to the first and second sub jib mounting arms is changed; and the camera is configured to be movable in an up-and-down direction while maintained horizontal by changing the angle of the sub jib to the first and second sub jib mounting arms.

2. The apparatus of claim 1, wherein a straight line connecting the first and second shafts is configured to be in parallel with the sub jib.

3. The apparatus of claim 1, wherein the apparatus is configured to allow attachment of a camera battery to the jib.

4. The apparatus of claim 1, wherein the jib is provided with a power on/off switch and a power unit, the switch and the unit being controlled according to a power on/off signal from a cameraman.

5. The apparatus of claim 1, wherein the jib is connected to a remote controller terminal of the camera by a cable and the jib is provided with a recording button.

6. The apparatus of claim 1, wherein the jib is connected to a remote controller terminal of the camera by a cable and the jib is provided with a control unit to control at least one of a focal position, a zoom position, and an aperture position of a lens.

7. The apparatus of claim 1, wherein a shaft kept horizontal in the same manner as the camera is configured to allow attachment of a monitor and a remote controller.

8. The apparatus of claim 1, wherein the jib has a tally display function.

9. The apparatus of claim 1, wherein the main jib is attachable to a long arm jib longer than the main jib.

* * * * *